US011835681B2

(12) United States Patent
Lin et al.

(10) Patent No.: US 11,835,681 B2
(45) Date of Patent: Dec. 5, 2023

(54) TOPOLOGY OPTIMIZED MULTI-LAYERED META-OPTICS

(71) Applicants: PRESIDENT AND FELLOWS OF HARVARD COLLEGE, Cambridge, MA (US); PRINCETON UNIVERSITY, Princeton, NJ (US)

(72) Inventors: Zin Lin, Boston, MA (US); Federico Capasso, Cambridge, MA (US); Alejandro W. Rodriquez, Princeton, NJ (US); Marko Loncar, Belmont, MA (US); Benedikt Groever, Somerville, MA (US)

(73) Assignees: PRESIDENT AND FELLOWS OF HARVARD COLLEGE, Cambridge, MA (US); PRINCETON UNIVERSITY, Princeton, NJ (US)

( * ) Notice: Subject to any disclaimer, the term of this patent is extended or adjusted under 35 U.S.C. 154(b) by 684 days.

(21) Appl. No.: 16/623,378

(22) PCT Filed: Jun. 19, 2018

(86) PCT No.: PCT/US2018/038357
§ 371 (c)(1),
(2) Date: Dec. 16, 2019

(87) PCT Pub. No.: WO2019/103762
PCT Pub. Date: May 31, 2019

(65) Prior Publication Data
US 2020/0183050 A1    Jun. 11, 2020

Related U.S. Application Data

(60) Provisional application No. 62/522,030, filed on Jun. 19, 2017.

(51) Int. Cl.
G02B 1/00      (2006.01)
G02B 3/00      (2006.01)
G02B 27/00     (2006.01)

(52) U.S. Cl.
CPC .......... *G02B 1/005* (2013.01); *G02B 3/0087* (2013.01); *G02B 27/0037* (2013.01)

(58) Field of Classification Search
CPC .... H01Q 15/0086; G02B 1/002; G02B 5/008; G02B 5/0226; G02B 27/4211; G02B 5/1809; G02F 1/29
See application file for complete search history.

(56) References Cited

U.S. PATENT DOCUMENTS 10,725,290 B2 *  7/2020  Fan ................... G02B 27/0012
2012/0327666 A1  12/2012  Liu et al.
(Continued)

FOREIGN PATENT DOCUMENTS

CN          105676314 A   *  6/2016
WO     WO-2016/168173 A1    10/2016
WO     WO-2016168173  A1 *  10/2016  ............. G02B 1/002

OTHER PUBLICATIONS

Amir Arbabi et al., Reflective Optical Phase Modulator Based on High-Contrast Grating Mirrors, 2014, Optical Society of America, (Year: 2014).*
(Continued)

*Primary Examiner* — Ephrem Z Mebrahtu
(74) *Attorney, Agent, or Firm* — FOLEY & LARDNER LLP

(57) ABSTRACT

A multi-layered lens comprises a plurality of metasurface layers. At least some layers of the plurality of metasurface layers include features that exhibit angular phase controls. The angular phases of the at least some layers cause an angular aberration correction or an angle convergence that focuses light onto a focal point regardless of angles of incidence.

21 Claims, 3 Drawing Sheets

(56) References Cited

U.S. PATENT DOCUMENTS

| | | |
|---|---|---|
| 2013/0016030 A1 | 1/2013 | Liu et al. |
| 2013/0208332 A1 | 8/2013 | Yu et al. |
| 2015/0219806 A1* | 8/2015 | Arbabi ................. G02B 5/1842 |
| | | 29/436 |
| 2016/0299337 A1* | 10/2016 | Arbabi ................. G02B 5/0294 |
| 2016/0306079 A1* | 10/2016 | Arbabi ................. G02B 5/0268 |
| 2017/0082263 A1 | 3/2017 | Byrnes et al. |
| 2017/0212285 A1* | 7/2017 | Arbabi ................... G02B 1/002 |
| 2018/0045953 A1* | 2/2018 | Fan ........................ G02B 1/002 |
| 2018/0292644 A1* | 10/2018 | Kamali .............. G02B 26/0875 |
| 2019/0191144 A1* | 6/2019 | Arbabi ..................... G02B 3/08 |
| 2020/0052027 A1* | 2/2020 | Arbabi ................... H04N 23/55 |
| 2020/0249429 A1* | 8/2020 | Han ................... G02B 13/0035 |
| 2020/0284960 A1* | 9/2020 | Ellenbogen .............. G02B 5/20 |

OTHER PUBLICATIONS

International Search Report and Written Opinion for International Patent Application No. PCT/US2018/038357, dated May 13, 2019, 8 pages.
Khorasaninejad, et al., "Visible Wavelength Planar Metalenses Based on Titanium Dioxide", IEEE Journal of Selected Topics in Quantum Electronics, vol. 23, No. 3, May/Jun. 2017, 16 pages.

\* cited by examiner

TOPOLOGY OPTIMIZED MULTI-LAYERED META-OPTICS

CROSS-REFERENCE TO RELATED APPLICATIONS

This application is a National Stage Entry of International Application No. PCT/US2018/038357, filed on Jun. 19, 2018, which claims the benefit of and priority to U.S. Provisional Patent Application 62/522,030, filed Jun. 19, 2017, which is incorporated herein by reference in its entirety.

STATEMENT OF FEDERALLY SPONSORED RESEARCH OR DEVELOPMENT

This invention was made with Government support under FA9550-14-1-0389, awarded by the Air Force Office of Scientific Research, DGE-1144152, awarded by National Science Foundation, and DMR-1454836, awarded by National Science Foundation. The Government has certain rights in the invention.

BACKGROUND

The present disclosure relates to apparatuses and methods for optical devices.

SUMMARY

The present disclosure is directed to a general topology optimization framework for metasurface inverse design that can automatically discover highly complex multi-layered meta-structures with increased functionalities. In particular, at least some embodiments of the present disclosure disclose topology-optimized multi-layered geometries exhibiting angular phase control, including a single-piece nanophotonic metalens with angular aberration correction as well as an angle-convergent metalens that focuses light onto the same focal spot regardless of the angle of incidence.

DETAILED DESCRIPTION

Figure 1:
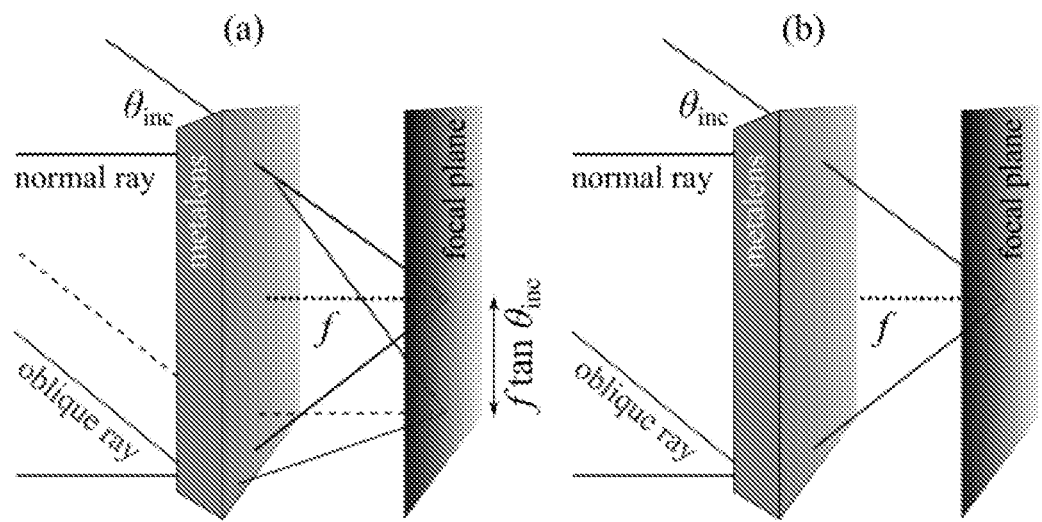
FIG. 1 illustrates (a) a single-piece nanophotonic aberration-corrected metalens and (b) an angle-convergent metalens.

Phase gradient metasurfaces are a class of optical devices which exploit complex electromagnetic interactions within nano-structured interfaces to elicit arbitrary manifestations of light waves at macroscale, having important applications in various technologies such as imaging, sensors, holography and beam steering. So far, the design of these devices primarily relies on trial and error methods which seek to enumerate all the possible parameter variations and sift out the ones that work. Understandably, the range of structures and functionalities that can be designed by these methods is constrained. At least some embodiments of the present disclosure are directed to an optimization framework that greatly expands the scope of metasurface designs as well as the functionalities of the metasurfaces. A disclosed optimization algorithm can automatically discover complex design geometries at a greatly enhanced speed guided by an original merit function that efficiently evaluates the performance of the device under optimization and, upon reaching the maximum value, ensures any desired light wave effects. In particular, the method is applied to design highly-interacting multi-layered meta-structures with wide spectral and angular control, which is a vastly more difficult problem than those that can be handled by any existing design methods.

One application of the disclosed method is the design of a multi-layered metalens with angular aberration correction. The comparative refractive lens or comparative flat-optics metalens suffers from aberrations that arise from the lens being unable to correctly focus the light waves coming at oblique incident angles. The existing approach to correcting these aberrations is to make two or more lens separated by several millimeters to centimeters, relying on the classical ray tracing mechanism without considering full-wave electromagnetic effects. The disclosed method offers an alternative design, based on multi-layered meta-structures, with orders of magnitude reduction in size (from mm in traditional designs to several nm or a few um in our design), buttressed by a radically different physical mechanism which fully exploits electromagnetic interactions at the nanoscale.

Phase-gradient metasurfaces have recently received widespread attention due to their successful applications in technologies such as beam steering, imaging and holography. Although phase-gradient metasurfaces offer many advantages in terms of size and scaling over traditional refractive bulk optics, their capabilities are constrained with respect to spectral and angular control. Theoretical analysis of ultra-thin metasurfaces suggests that to circumvent such constraints, it might employ exotic elements such as active permittivities (e.g. optical gain), bi-anisoptropy, magnetic materials, or even nonlocal response elements. Although materials with such properties might be found in the radio-frequency (RF) regime, they are not readily available at optical frequencies. Alternatively, device functionalities may be enhanced by increasingly complex geometric design. For instance, multifunctional devices have been demonstrated by cascading a few layers of metasurfaces, each of which comprises typical dielectric materials. So far, at least some of the multi-layered meta-structures (MMS) fall into a category of structures where each layer is sufficiently far apart from the other and can be considered independently.

At least some embodiments of the present disclosure describe a class of MMS involving several tightly spaced layers which allow richer physical interactions within and between layers and thereby offer increased functionalities. One property of these MMS is that each layer is not treated independently of the other but is considered integrally in the design process. Such a consideration often leads to a greatly extended design space that may not be handled by comparative design methods, which rely on pre-compiled libraries of intuitive geometrical elements. According to at least some embodiments, a general topology optimization (TO) framework can automatically identify highly complex MMS with broad functionalities.

FIG. 1 shows schematics (not to scale) of (a) a single-piece nanophotonic aberration-corrected metalens and (b) an angle-convergent metalens. The metalens ensures diffraction-limited focusing under general oblique incidence either onto a laterally shifted focal spot (a) or onto the same on-axis focal spot (b). According to embodiments show in FIG. 1, two TO multi-layered geometries exhibit angular phase control: a single-piece nanophotonic metalens with angular aberration correction (FIG. 1(a)) and an angle-convergent metalens that focuses light onto the same focal spot regardless of incident angle (FIG. 1(b)).

Inverse Design Formulation

Topology optimization (TO), is an efficient computational technique that handles an extensive design space, considering the dielectric permittivity at every spatial point as a degree of freedom (DOF). In particular, an electromagnetic TO problem can be written as follows:

$$\max F(E;\overline{\in}) \tag{1}$$

$$G(E;\overline{\in}) \leq 0 \tag{2}$$

$$0 \leq \overline{\in} \leq 1 \tag{3}$$

Here, the set of DOFs $\{\overline{\in}\}$ is related to the position-dependent dielectric profile via $\in(r)=(\in_{st}-\in_{bg})\overline{\in}(r)+\in_{bg}$, where $\in_{st}$ {bg} denotes the relative permittivity of the structural (background) dielectric material. While $\overline{\in}$ may take intermediate values between 0 and 1, this may ensure a binary (digital) structure via a variety of penalization and filter projection methods. The objective F and constraint G are typically functions of the electric field E which is, in turn, a solution of the Maxwell's equation, $$\nabla \times \frac{1}{\mu} \nabla \times E - \in(r)\frac{\omega^2}{c^2}E = i\omega J, \tag{4}$$

describing the steady-state $E(r;\omega)$ in response to incident currents $J(r,\omega)$ at frequency $\omega$. To make optimization problems tractable, the method obtains a fast-converging and computationally efficient adjoint formulation of the problem. Within the scope of TO, this may lead to efficient calculations of the derivatives $$\frac{\partial F}{\partial \in(r)}, \frac{\partial G}{\partial \in(r)}$$

at every spatial point r, which may involve exploiting the adjoint-variable method.

Inverse-design techniques based on TO may be applied to a variety of photonic systems including, e.g., on-chip mode splitters, nonlinear frequency converters and Dirac cone photonic crystals. The disclosed technology includes large-scale computational techniques tailored for metasurfaces design. Here, a general optimization framework is introduced for designing a generic meta-optics device, single or multi-layered, with arbitrary phase response. The formulation may depend on superposition principle: given a desired phase profile $\phi(r)$, the ideal wavefront $e^{i\Phi(r)}$ and the complex electric field E(r) may constructively interfere if (or only if) their phase difference vanishes. Here, $E(r)=E(r)\cdot\hat{e}$ for a given polarization $\hat{e}$. Following this line of reasoning, an optimization function is:

$$F(\overline{\in}) = \frac{1}{v}\int \frac{|E(r)+e^{i\phi(r)}|^2 - |E(r)|^2 - 1}{2|E(r)|}dr, \tag{5}$$

where $$\frac{1}{v} = \int dr,$$

and the spatial integration is performed over a reference plane (typically one or two wavelengths away from the meta-device) where $\phi(r)$ is defined. Note that F is none other than a spatially-averaged cosine of the phase difference between $e^{i\Phi(r)}$ and E(r):

$$F(\overline{\in}) = \frac{1}{v}\int \cos(\arg E(r) - \phi(r))dr,$$

with the property F≤1. Therefore, F can be used as a measure to monitor and characterize the performance of the device under construction while F≈1 indicates that the design being optimized has converged to an optimal solution. In some embodiments, F≈99 may be obtained for optimization problems investigated.

Angular Phase Control

One feature of nanoscale meta-devices is their potential for arbitrary wavefront manipulation under various control variables including wavelength, polarization or incident angle. At least some embodiments of the present disclosure describe angular control. In some embodiments, realizing angular control in conventional single-layer ultra-thin metasurfaces might be hard since the interface is constrained by the generalized Snell's laws. On the other hand, MMS with thicknesses on the order of a wavelength or more (whose internal operation cannot be described via ray optics) can overcome such a constraint. In principle, MMS can be engineered to exhibit directionality even though conventional approaches which rely on intuitive, hand designs might prove unequal to such a task. The disclosed optimization algorithm develops multi-functional structures where an arbitrary phase response that varies with the angle of incidence can be imprinted on the same device.

In some embodiments, at least one objective in the design of metalenses is the creation of a single, hyperbolic phase profile:

$$\phi(r) = \phi_0 - \frac{2\pi}{\lambda}\left(\sqrt{f^2 + (r-r_0)^2} - f\right),$$

characterized by the focal length f, in response to a normally incident plane wave. Here, $r_0$ denotes the center of the lens whereas $\phi_0$ denotes an arbitrary phase reference that can be varied as an additional degree of freedom in the metasurface design. The design may be free of spherical aberrations but may still suffer from angular and off-axis aberrations such as coma and field curvature. These errors may arise out of a phase profile that skews the oblique off-axis rays. A corrected phase profile free from aberration may be therefore angle-dependent, as given by:

$$\phi(r, \phi_{inc}) = \phi_0(\theta_{inc}) - \frac{2\pi}{\lambda}\left(\sqrt{f^2 + (r - r_0 - f\tan\theta_{inc})^2} - f\right).$$

Note that the above expression can be deduced by considering the optical path length contrast between a generic ray and the orthonormal ray directed towards a focusing spot laterally shifted by $f \tan \theta_{inc}$ (see FIG. 1(a), dashed line). Here, the TO algorithm is used to design a 2D miniature angle-corrected metalens with the angle-dependent phase profile given above. Note that though the disclosed technology can also design a full 3D wide-area (e.g., centimeter-scale) single-piece monochromatic aberration-free lens using the TO technique. While the traditional aberration corrected doublet relies on classical ray tracing techniques, the disclose technology intricately exploits nano-scale electromagnetic effects to achieve angular control.

Figure 2:
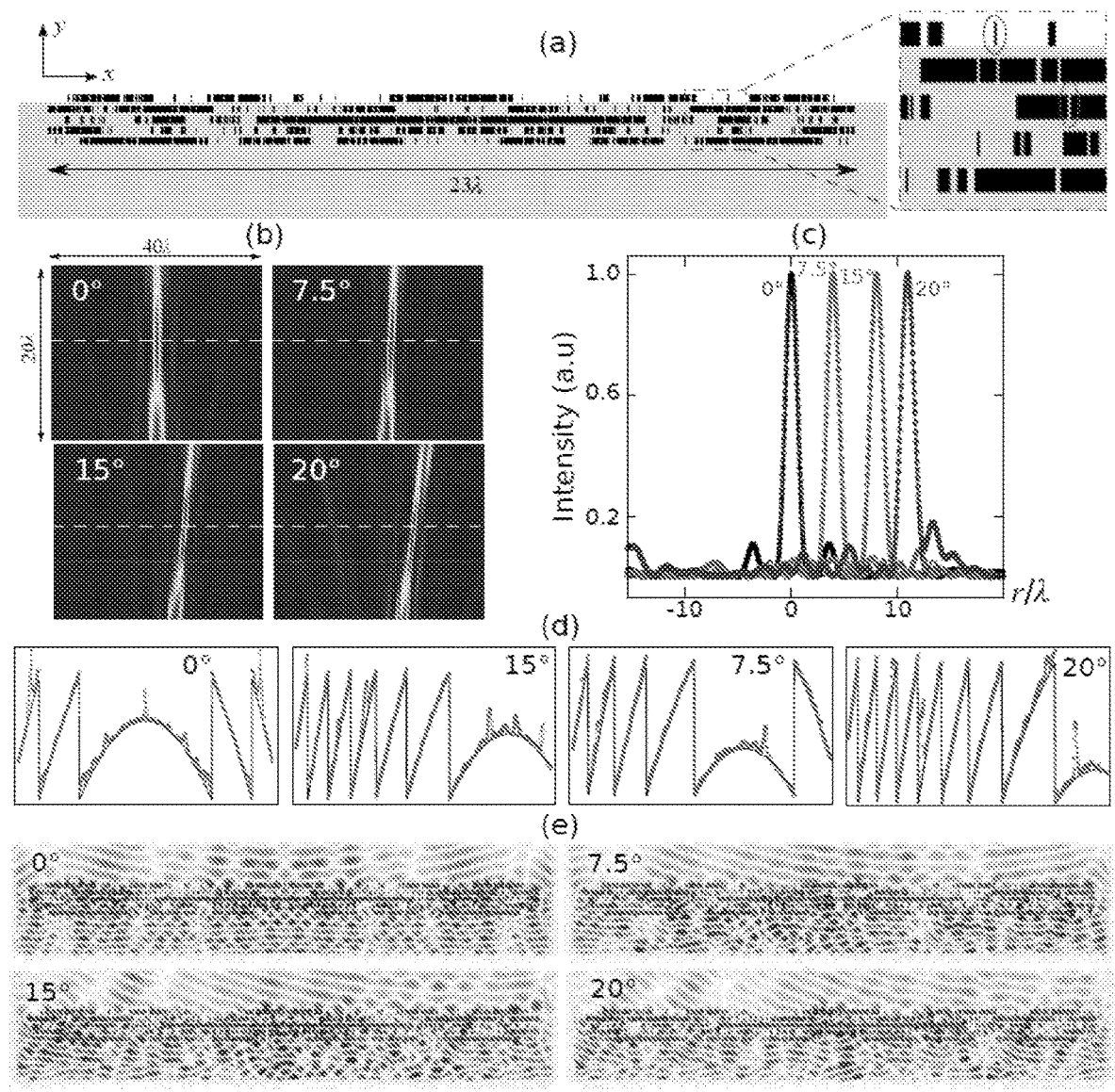
FIG. 2 illustrates (a) a multi-layered two-dimensional (2D) lens which is aberration-corrected for four incident angles; (b) results of a finite-difference time-domain (FDTD) analysis of far field profiles (density plots) that reveal focusing action for the four incident angles; (c) The field intensities (circle points) at the focal plane follow the ideal diffraction limit (solid lines); (d) The corresponding phase profile (circle data points) for each angle is measured at a distance, showing good agreement with the ideal profile (solid line); and (e) Near-field profiles with out-going spherical wavefronts.

FIG. 2(a) shows a multi-layered miniature 2D lens (NA=0.35, f=30λ) which is aberration-corrected for four incident angles {0°, 7.5°, 15°, 20°}, λ being the wavelength. Note that by virtue of symmetry, the lens may be automatically corrected for the negative angles as well {−7.5°,−15°,−20°}. The lens materials include five layers of silicon (black) in alumina matrix (gray). A portion of the lens is magnified for easy visualization (inset); the smallest features (such as those encircled within dotted oval lines) measure 0.02λ, while the thickness of each layer is 0.2λ.

FIG. 2(b) shows the results of an FDTD analysis of the far field profiles (density plots) that reveal focusing action for the four incident angles. Note that the focal plane is denoted by a white dashed line. FIG. 2(c) shows the field intensities (circle points) at the focal plane follow the ideal diffraction limit (solid lines). Note that the intensities are normalized to unity for an easy comparison of the spot sizes. FIG. 2(d) The corresponding phase profile (circle data points) for each angle is measured at a distance of 1.5λ from the device, showing good agreement with the predicted profile (solid line). FIG. 2(e) shows near-field profiles with out-going spherical wavefronts.

In some embodiments, a lens has a numerical aperture (NA) of 0.35 and a focal length of 30λ. The device includes five layers of topology-optimized aperiodic silicon gratings (invariant along z) against amorphous alumina background (see FIG. 2(a)). Each silicon layer is 0.2λ thick and is separated by 0.1λ alumina gaps. Silicon and alumina may be chosen with a view to eventual fabrication at mid or far IR wavelengths (5-8 μm) by stacking patterned 2D slabs via repeated lithography, material deposition and planarization processes. The entire lens has a thickness of 1.5λ, offering ample space for complex electromagnetic interactions while, at the same time, maintaining orders of magnitude smaller thickness compared to traditional multi-lens systems. The lens is aberration corrected for four incident angles {0°, 7.5°, 15°, 20°} as well as their negative counterparts {−7.5°, −15°, −20°}. Note that the largest possible angle for diffraction-limited focusing may be, e.g., ≈21° and is determined by the numerical aperture. For simplicity, the method may consider off-axis propagation in the xy plane with an s-polarized electric field parallel to the direction of the gratings, E=E(r)ẑ. FDTD analysis of the far field (see FIG. 2(b)) reveals focusing action with diffraction limited intensity profiles (FIG. 2(c)), while the transmission efficiencies average around 25% for the four angles. To evaluate the deviation of the design from the predicted phase profile, the wave aberration function (WAF) is computed for each angle, obtaining WAF{0°,±7.5°,±15°,±20°}=(0.07, 0.04, 0.06, 0.08), which clearly satisfy the Marechal criterion WAF≤1/14 except for the 20° incident angle. The errors in the latter case primarily arise from the difficulty over optimizing the extremities of the lens, which can be mitigated by extending the optimized lens area (or equivalently designing a larger NA). Note that the residual phase errors apparent in the optimized design primarily stem from specifying the optimal design to be binary while being constrained by a finite resolution. In some embodiments, the device may have a spatial resolution step size Δr=λ/50 over a 23λ-long simulation domain while our optimization algorithm handles approximately 5600 degrees of freedom. These parameters may be dictated by the finite computational resources available. Without the binary constraint (e.g., when each DOF is allowed to take intermediate values between 0 and 1), the optimal designs may achieve phase profiles with WAFs smaller than 0.01. In some other embodiments, with better computational facilities, optimization over higher resolution domains will lead to binary structures that also preserve vanishing WAF≈0.

Figure 3:
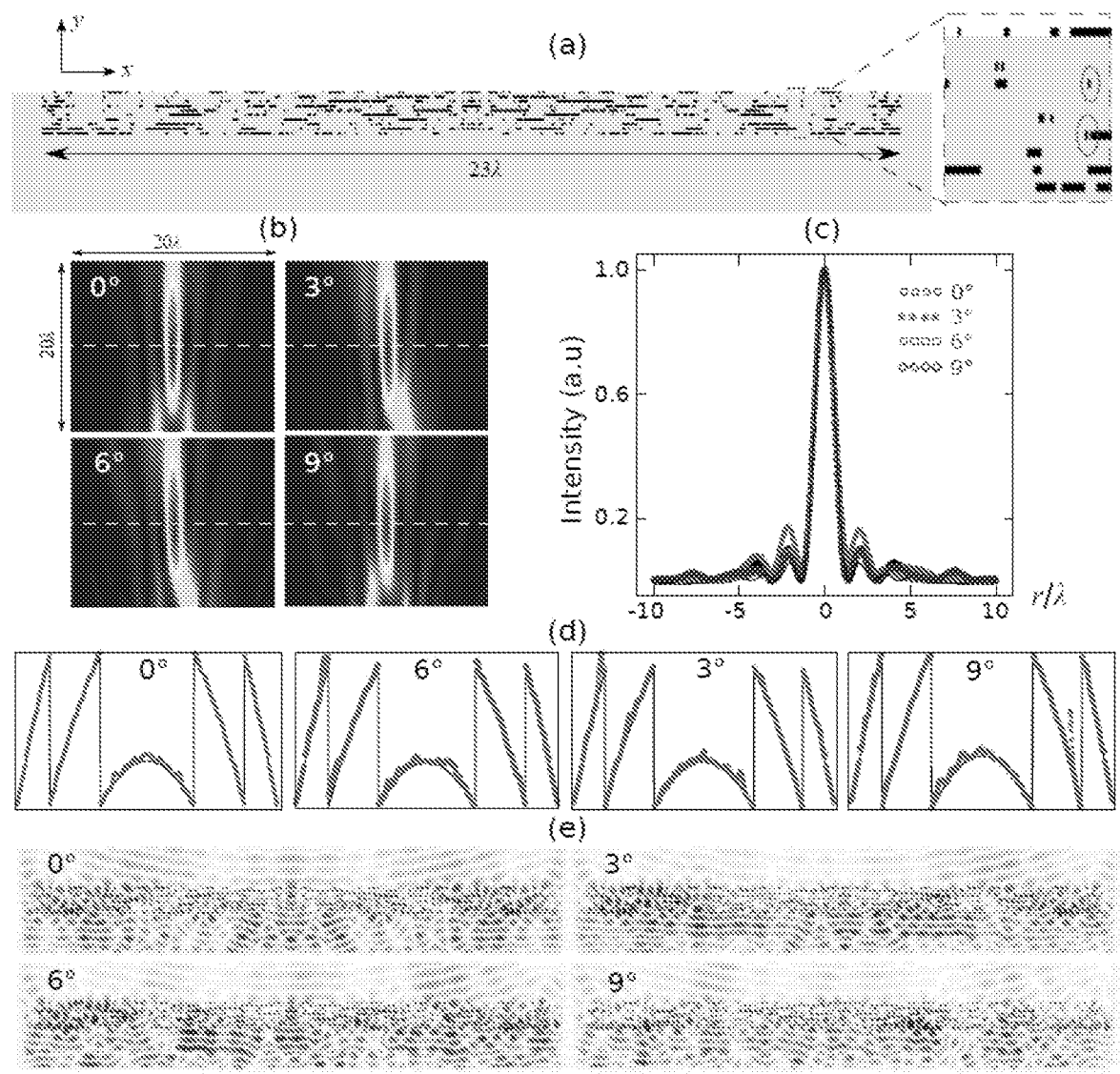
FIG. 3 illustrates (a) a multi-layered 2D lens that exhibits on-axis focusing for the incident angles; (b) results of an FDTD analysis of the far field profiles (density plots) that reveal the same focal spot for the different incident angles; (c) The intensities (symbolic data points) at the focal plane follow the on-axis ideal diffraction limit for all the incident angles (solid line); (d) The corresponding phase profile (circle data points) for each angle is measured at a distance, showing good agreement with the ideal profile (solid line); and (e) Near-field profiles with almost perfect out-going spherical wavefronts.

FIG. 3(a) shows a multi-layered miniature 2D lens (NA=0.35, f=30λ) that exhibits on-axis focusing for the incident angles {0°,±3°,±6°,±9°}. The lens materials include ten layers of silicon (black) in silica matrix (gray). A portion of the lens is magnified for easy visualization (inset); the smallest features (such as those encircled within dotted oval lines) measure 0.02λ while the thickness of each layer is 0.05λ.

FIG. 3(b) shows results of an FDTD analysis of the far field profiles (density plots) that reveal the same focal spot for the different incident angles. Note that the focal plane is denoted by a dashed line. FIG. 3(c) shows the intensities (symbolic data points) at the focal plane follow the on-axis diffraction limit for all the incident angles (solid line). FIG. 3(d) shows the corresponding phase profile (circle data points) for each angle is measured at a distance of 1.5 k from the device, showing good agreement with the predicted profile (solid line). FIG. 3(e) shows near-field profiles with out-going spherical wavefronts.

In some embodiments, to demonstrate the versatility of our approach, a 2D metalens can focus light onto the same spot regardless of the angle of incidence (FIG. 1(b))—a device which is also referred to as angle-convergent metalens. Specifically, the phase profile is imposed:

$$\phi(r) = \phi_0(\theta_{inc}) - \frac{2\pi}{\lambda}\left(\sqrt{f^2 + (r - r_0)^2} - f\right)$$

on the outgoing field under multiple discrete incident angles {0°,±3°,±6°,±9°}. The lens has an NA of 0.35 and a focal length of 30λ. The lens materials may include ten layers of 0.05λ thick silicon in silica separated by 0.05λ gaps (FIG. 3(a)), making the entire device approximately one λ thick. Such a device can be fabricated using advanced 3D photonic integration techniques. Far field analysis (FIG. 3(b)) shows focusing action at the same focal spot for all the angles. Although the field intensities at the focal spot may not exactly follow the profile of an ideal Airy disk due to residual phase errors, their bandwidth (aka full width at half maximum) clearly satisfies the diffraction limit (FIG. 3(c)). The diffraction-limited focusing is also consistent with small WAFs which are found to satisfy the Marechal criterion: WAF$\{0°,\pm3°,\pm6°,\pm9°\}$=(0.02, 0.04, 0.04, 0.02)<$1/14$. The transmission efficiency of the device averages around 15% over all angles.

It is to be understood that that the number, positioning and thicknesses of layers are arbitrarily chosen in the embodiments. It is possible that depending on the desired level of performance, one can achieve viable designs using fewer/more and/or thicker/thinner layers, which may render the entire device even thinner and easier to fabricate.

It is also to be understood that while the disclosed embodiments describe phase control, in some embodiments, controlling of additional features such as amplitude uniformity and high efficiency constraints, which can be added to disclosed technology. For example, a full three-dimensional (3D) multi-layered device platform may accommodate the additional demands of optimization. The multi-layered volumetric structures (e.g., no more than a few wavelengths thick) may help deliver unprecedented wavefront manipulation capabilities at the nanoscale that involve phase, intensity and polarization control as well as spectral and angular dispersion engineering altogether in a single device. For example, fabrication of multilayered nanostructures might be possible in, e.g., mid to far infrared IR regimes, through 3D fabrication technologies such as two-photon lithography, laser writing processes, advanced foundry access as well as ultra-high resolution EUV (extreme ultraviolet) lithography.

In some embodiments, a multi-layered lens or an optical device has a design wavelength and focuses light onto a focal point regardless or independent of angles of incidence of light of the design wavelength, such that a position of a peak intensity associated with the focal point (across a range of the angles of incidence) is within a range of variation of less than or equal to $\pm10\%$ of the design wavelength, such as less than or equal to $\pm5\%$, less than or equal to $\pm4\%$, less than or equal to $\pm3\%$, less than or equal to $\pm2\%$, less than or equal to $\pm1\%$, less than or equal to $\pm0.5\%$, less than or equal to $\pm0.1\%$, or less than or equal to $\pm0.05\%$. In some embodiments, the design wavelength is in the ultraviolet spectrum, the visible spectrum, near-infrared spectrum, or far-infrared spectrum. In some embodiments, the range of the angles of incidence is about 3 degrees or greater, about 6 degrees or greater, or about 9 degrees or greater.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to $\pm10\%$ of that numerical value, such as less than or equal to $\pm5\%$, less than or equal to $\pm4\%$, less than or equal to $\pm3\%$, less than or equal to $\pm2\%$, less than or equal to $\pm1\%$, less than or equal to $\pm0.5\%$, less than or equal to $\pm0.1\%$, or less than or equal to $\pm0.05\%$. For example, two numerical values can be deemed to be "substantially" the same if a difference between the values is less than or equal to $\pm10\%$ of an average of the values, such as less than or equal to $\pm5\%$, less than or equal to $\pm4\%$, less than or equal to $\pm3\%$, less than or equal to $\pm2\%$, less than or equal to $\pm1\%$, less than or equal to $\pm0.5\%$, less than or equal to $\pm0.1\%$, or less than or equal to $\pm0.05\%$.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A multi-layered lens, comprising:
a plurality of metasurface layers, at least some layers of the plurality of metasurface layers include features that exhibit angular phase controls, wherein at least two layers of the plurality of metasurface layers each has a first material with a first refractive index embedded in a second material having a second refractive index lower than the first refractive index;
wherein the at least two layers are separated from each other by less than a design wavelength of the multi-layered lens;
wherein angular phases of the at least some layers cause an angular aberration correction or an angle convergence that focuses light onto a focal point regardless of angles of incidence;

wherein the at least two layers comprise a first metasurface layer with a first structure and a second metasurface layer with a second structure different than the first structure; and wherein the first metasurface layer and the second metasurface layer are aperiodic.

2. The multi-layered lens of claim 1, wherein each layer of the plurality of metasurface layers has a thickness less than the design wavelength of the multi-layered lens.

3. The multi-layered lens of claim 2, wherein each layer of the plurality of metasurface layers is separated from an adjacent layer of the plurality of metasurface layers by less than the design wavelength of the multi-layered lens.

4. The multi-layered lens of claim 2, wherein each layer of the plurality of metasurface layers is separated from an adjacent layer of the plurality of metasurface layers.

5. The multi-layered lens of claim 2, wherein a total thickness of the plurality of metasurface layers is greater than or equal to the design wavelength of the multi-layered lens.

6. The multi-layered lens of claim 1, wherein the angle convergence focuses light onto the focal point at a focal plane independent of angles of incidence.

7. The multi-layered lens of claim 1, wherein the multi-layered lens comprises two different angular responses respectively for two orthogonal polarizations of light.

8. The multi-layered lens of claim 1, wherein the multi-layered lens controls an amplitude, a phase and a polarization state of an incident light over a set of incident angles.

9. The multi-layered lens of claim 1, wherein the first material is silicon, and the second material is silicon dioxide or alumina.

10. The multi-layered lens of claim 1, wherein the plurality of metasurface layers transmissively exhibit the angular phase controls.

11. The multi-layered lens of claim 3, wherein the plurality of metasurface layers comprise at least three metasurface layers and include a combined thickness of equal to or less than 1.5 design wavelength of the multi-layered lens.

12. The multi-layered lens of claim 1, wherein the plurality of metasurface layers comprise a single, hyperbolic phase profile defined by:

$$\phi(r) = \phi_0 - 2\pi/\lambda(\sqrt{f^2 + (r-r_0)^2} - f),$$

where r is a spatial point of the multi-layered lens, f is focal length, $r_0$ is a center of the multi-layered lens, $\phi_0$ is an arbitrary phase reference.

13. An optical device, comprising:
a substrate; and
a plurality of metasurface layers disposed on the substrate, at least some layers of the plurality of metasurface layers include features that exhibit angular phase controls, wherein at least two layers of the plurality of metasurface layers each has a first material with a first refractive index embedded in a second material having a second refractive index lower than the first refractive index;

wherein the at least two layers are separated from each other by less than a design wavelength of the multi-layered lens;

wherein angular phases of the at least some layers cause an angular aberration correction or an angle convergence that focuses light onto a focal point regardless of angles of incidences;

wherein the at least two layers comprise a first metasurface layer with a first structure and a second metasurface layer with a second structure different than the first structure; and wherein the first metasurface layer and the second metasurface layer are aperiodic.

14. The optical device of claim 13, wherein each layer of the plurality of metasurface layers has a thickness less than the design wavelength of the optical device.

15. The optical device of claim 14, wherein each layer of the plurality of metasurface layers is separated from an adjacent layer of the plurality of metasurface layers by less than the design wavelength of the optical device.

16. The optical device of claim 14, wherein each layer of the plurality of metasurface layers is separated from an adjacent layer of the plurality of metasurface layers.

17. The optical device of claim 14, wherein a total thickness of the plurality of metasurface layers is greater than or equal to the design wavelength of the optical device.

18. The optical device of claim 13, wherein the angle convergence focuses light onto the focal point at a focal plane independent of angles of incidence.

19. The optical device of claim 13, wherein the optical device comprises two different angular responses respectively for two orthogonal polarizations of light.

20. The optical device of claim 13, wherein the optical device controls an amplitude, a phase and a polarization state of an incident light over a set of incident angles.

21. The optical device of claim 13, wherein the first material is silicon, and the second material is silicon dioxide or alumina.

* * * * *